Feb. 23, 1971   L. D. RHOADS   3,564,823
POWER RAKE

Original Filed July 20, 1967   8 Sheets-Sheet 1

INVENTOR.
LOY D. RHOADS

Fig. 3

Feb. 23, 1971 L. D. RHOADS 3,564,823
POWER RAKE

Original Filed July 20, 1967 8 Sheets-Sheet 3

INVENTOR.
LOY D. RHOADS

INVENTOR.
LOY D. RHOADS

INVENTOR.
LOY D. RHOADS

United States Patent Office 3,564,823
Patented Feb. 23, 1971

3,564,823
POWER RAKE
Loy D. Rhoads, Enon, Ohio, assignor to Parker Sweeper Company, Springfield, Ohio, a corporation of Ohio
Continuation of application Ser. No. 654,807, July 20, 1967. This application Mar. 2, 1970, Ser. No. 14,804
Int. Cl. A01g 1/12
U.S. Cl. 56—27        7 Claims

ABSTRACT OF THE DISCLOSURE

An assembly for a turf treating machine including a rotatable shaft, spaced bearings for the shaft in bearing plates, means being provided for attaching the assembly by the bearing plates to two supports. Specifically, the supports on the machine are provided with slots which receive studs carried by the bearing plates. Cam locking levers are movable for locking the studs in the slots.

CROSS REFERENCE TO RELATED APPLICATION

The present application is a continuation of the inventor's copending application Ser. No. 654,807 filed July 20, 1967, now abandoned.

BACKGROUND OF THE INVENTION (1) Field of the invention

The invention is directed to turf treating machines.

(2) Description of the prior art

The closest prior art is illustrated in the patents to Kiernan No. 2,770,938 issued Nov. 20, 1956 and to Oblinger No. 3,308,612 issued Mar. 14, 1967. The Kiernan patent discloses various lawn treating assemblies that are selectively attachable to a vehicle, but mechanism for attaching the assemblies to the vehicle are complicated, expensive and troublesome to manipulate. The Oblinger patent does not disclose a turf treating machine which includes assembly including bearing plates, bearings, a shaft and a reel.

SUMMARY OF THE INVENTION

More generally, the machine is employed for treating turf and it comprises assemblies, each including a reel having turf engaging members disposed in an open bottom compartment which is moved across the turf. The opposite side plates of the compartment form the aforementioned supports and each is provided with a slot. An abutment or shoulder is formed on each of the bearing plates, and the machine includes two cam lock levers which are adapted to engage the abutments on the bearing plates for retaining the studs in the slots, thus retaining the reel in operative position in the housing. The lever can be actuated readily whereby to permit the studs to be withdrawn from the slots in the side plates to thus permit the ready removal of the assembly, including the reel from the machine.

Other features and the advantages of the present invention will be apparent from the following description, reference being had to the accompanying drawings wherein a preferred embodiment of the invention is illustrated.

DESCRIPTION OF THE PREFERRED EMBODIMENT

Referring more in detail to the drawings, the machine 20 is of the turf treating type. It includes a frame 22 having a right side plate 24 and a left side plate 26. The side plates carry an axle 28 for rear wheels 30. The side plates carry a hood 32, the front 34 and part of the top 36 thereof is arcuate in shape. The top also includes a section 37 which extends rearwardly from the rear end of top part 36. The side plates 24 and 26, the hood 32 and rear section 37 form an open-bottom compartment. The front 34 of the hood 32 carries a bracket 38 which supports the front roller 40. The bracket is adjustable vertically, it being held in adjusted position by a cap screw 42 which is received by a vertical slot 44 in the bracket and is threaded into the front 34.

The top of section 37 carries a platform 46 which supports a motor in the form of an internal combustion engine 48 having a crank shaft 50. The platform 46 also carries a jack shaft 52. The axes of the axles 28 and shafts 50 and 52 are parallel. The crank shaft 50 and jack shaft 52 carry sheaves 54 and 56, respectively, disposed on the left side of the frame. These sheaves are connected with one another by a belt 58. The right side of the jack shaft 52 carries a sheave 60.

Handle support bars 62 are fastened to the side plates 24 and 26 and to the top section 36. These bars carry brace bars 64 and 65. The handle bars 68 are affixed to bars 62 and 64 by brackets 70 and 71. The upper ends of the handle bars 68 are provided with grips 72, and cross bar 66.

The jack shaft is rotatably connected to any one of a plurality of reels, herein shown as a tine reel 74, a knife reel 76 or a flail reel 78. FIGS. 3, 4, 5, 7 and 8 show a machine connected to drive the tine reel 74. One form of tine reel is shown in the copending application, Ser. No. 654,806, filed July 20, 1967, and now Pat. No. 3,478,580, executed on even date herewith. Each reel is in the form of an assembly.

Figure 7:
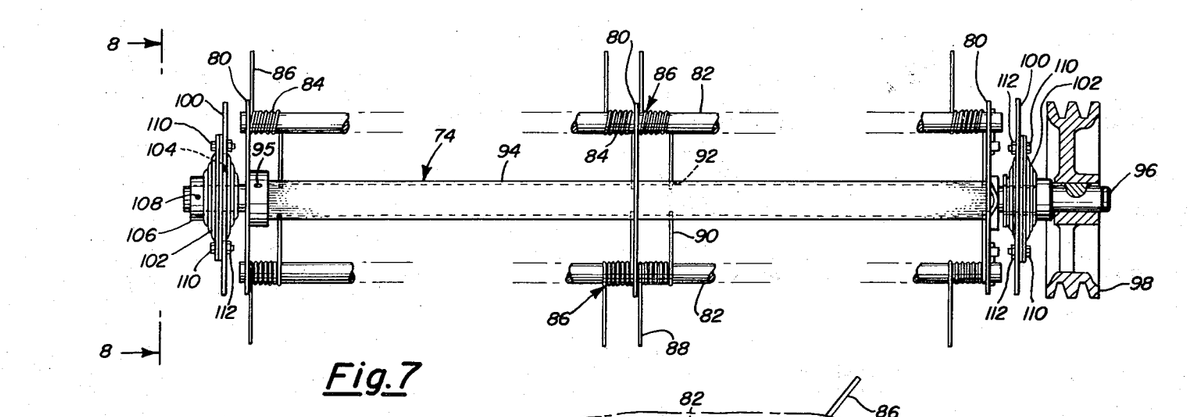
FIG. 7 is a rear view of a reel having resilient tines, such as that shown in FIG. 3.
Figure 8:
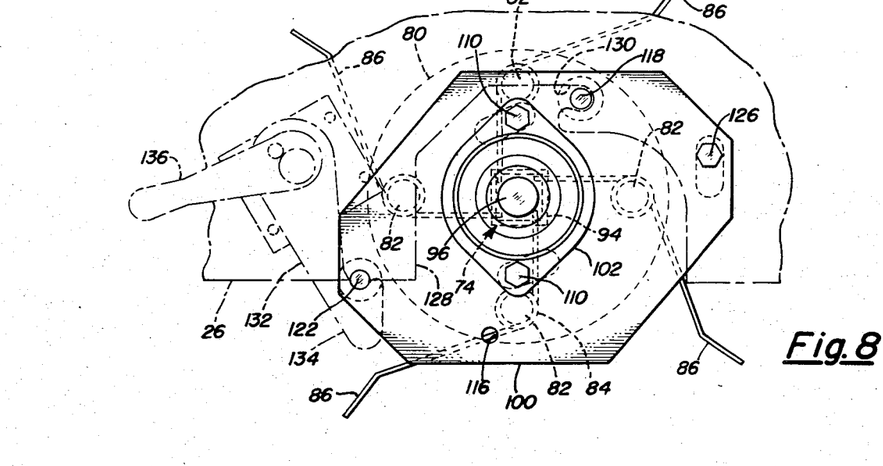
FIG. 8 is an end view of the reel shown in FIG. 7, the view being in the direction of arrow 8, showing the left bearing plate in the position it assumes when locked in the housing.

The tine reel 74 is part of an assembly that includes a plurality of plates 80, see FIGS. 7 and 8, which carry preferably four rods 82, which in turn carry the coil 84 of tines 86. The turf engaging portions 88 of the tines extend outwardly of the rods and the anchoring portions 90 extend into holes 92 in an outer shaft 94. An inner shaft 96 is fastened to the outer shaft 94 by a pin 95 and carries a sheave 98. The assembly including reel 74 includes two bearing plates 100 which carry ball bearing assemblies 102, like those shown in FIG. 9 of the patent to Oblinger, No. 3,308,612. A bearing assembly 102 extends into a hole 104 in the bearing plate and the inner race is provided with an extension 106 which is fastened to the inner shaft 96 by a set screw 108. The bearing assembly is fastened to the bearing plate by bolts 110 and nuts 112.

Each bearing plate is provided with four locating holes 114, 116, 120 and 123. The studs for bearing plates, when the latter are used on the tine reel, are shown at 118 fastened to the plate through hole 114 and those plates also include studs 122 forming abutments fastened to the plates through holes 123. Hole 120 receives a cap screw 126 for fastening the plate to one of the side plates 24 or 26 of the frame 22 when the plates are employed for fastening a tine reel to the machine.

The side plates 24 and 26 are allochiral in shape, each having a recess 128 which extends upwardly from the bottom of the plate. The upper end of the recess terminates in a rearwardly extending slot 130 in each side plate 24 and 26. The slots 130 and the holes for the cap screw 126, when the latter are fastened to side plates of the frame, are disposed so that the studs 118 are in the slots 130. The studs 118 are held in the slots 130 by levers 132, each having a hook portion 134 hooked about the stud 122 on the bearing plate. Two such levers are provided, one for each stud 122 of the bearing plates 100. The levers 132 are manipulated, from the locking position shown in FIG. 3 to a stud 118 releasing position as shown in FIG. 4, by a cam lock lever 136. As seen from FIG. 5, the reel is driven by the jack shaft 52 by a belt 138 connected to a sheave 60 on the jack shaft and by the assembly including the sheave 98 on the reel.

Assuming that it is desirable to remove the reel 74 from the machine, the cap screws 126 are removed; then the cam lock levers 136 are rotated clockwise on the left side and counterclockwise on the right side to release the hook portions 134 of the lever 132 from the studs 122; then the assembly is moved downwardly and then rearwardly on an arc with stud 118 as a center. After this rearward movement, the belts 138 are sufficiently slack so that they can be removed from the sheaves 98 and 60. After removing belts move reel assembly forward, releasing studs 118 from slots 130 so that assembly will move downwardly through the recesses 128, clearing the machine.

From the foregoing, it is apparent that the reel assembly can be removed readily from the machine. Likewise, the reel assembly can be readily attached to the machine. After the assembly including reel 74 is placed in such position that the studs 118 are disposed in slots 130; the belts 138 are placed on the sheaves 60 and 98. At this time the assembly including the reel 74 is moved forwardly and upwardly on an arc with the stud 118 as a center until studs 122 can be engaged with hook portion of 134 cam lock lever 136. The cap screws 126 are fastened to the side plates 24 and 26 of the frame 22. At this time, the levers 132 and 134 are in the position shown in FIG. 4. Then levers 132 and 134 are manipulated so as to move the hook portions 135 to the position shown in FIG. 3 to lock the reel in position.

The tine reel removes loose thatch and debris embedded in the turf without removing an appreciable amount of live grass.

Figure 9:
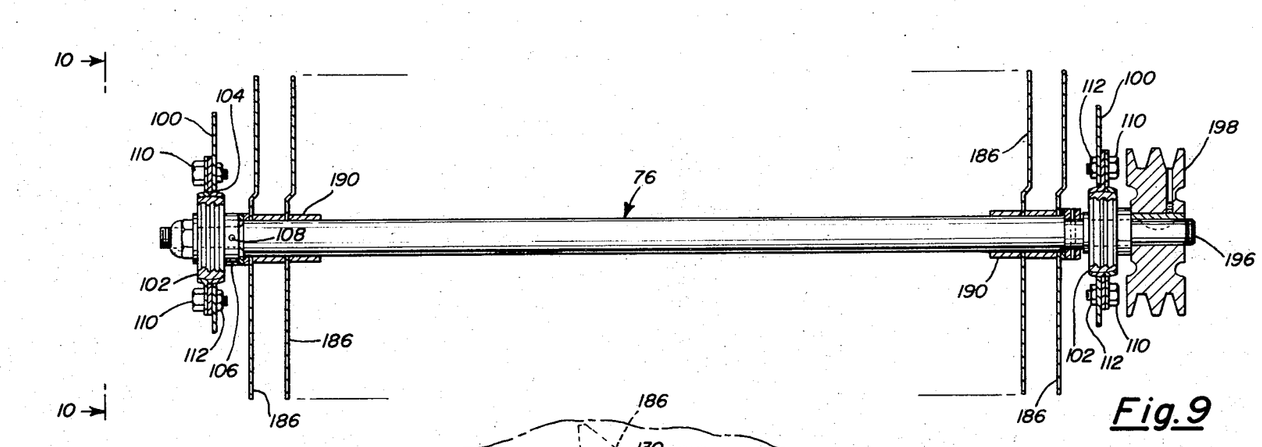
FIG. 9 is a rear view of a knife reel.
Figure 10:
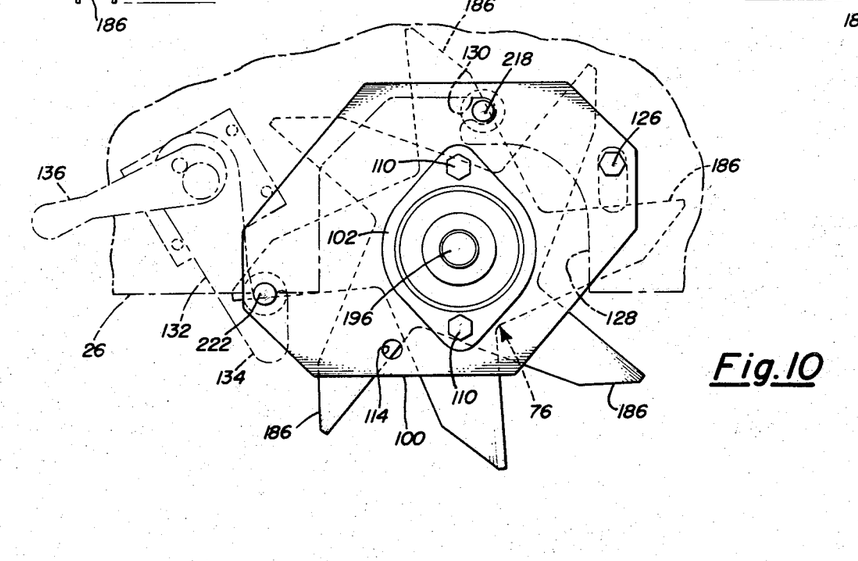
FIG. 10 is an end view of the reel shown in FIG. 9, the view being in the direction or arrow 10, showing the left bearing plate in the position it assumes when locked in the housing.

Referring now to the assembly including the knife reel 76 shown in FIGS. 9 and 10, it includes a shaft 196 to which a sheave 198 is keyed. A plurality of knives 186 are fastened to the shaft and spaced from one another by spacers 190. The bearing plates 100 are the same as those employed in the tine reel 74 and carry the bearing assemblies, but the stud 118 is not employed and instead a stud 218 is fastened to the bearing plate through hole 116. The bearing plates are obverse to those shown in the tine reel 74 and the studs are received by the slots 130 in the side plates 24 and 26 of the frame 22. Likewise, a stud 222 is applied to the bearing plate through the hole 120 so that it can function in cooperation with the hook portion 134 of lever 132 to lock the reel in position in frame 22. The hole 123 in the bearing plate now receives the cap screw 126.

Figure 1:
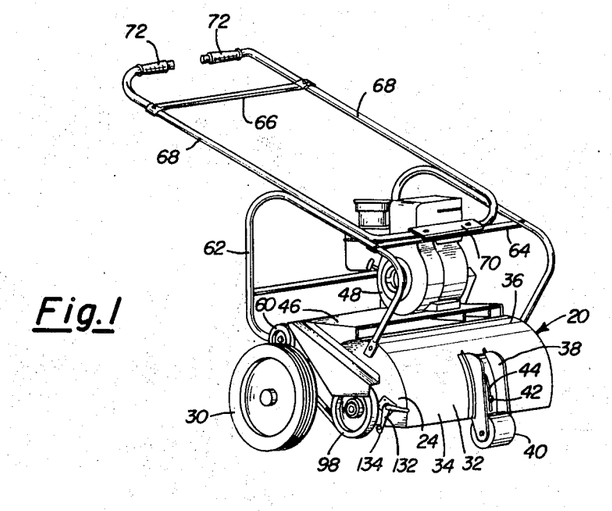
FIG. 1 is a perspective view of the machine looking toward the front and right sides thereof.
Figure 2:
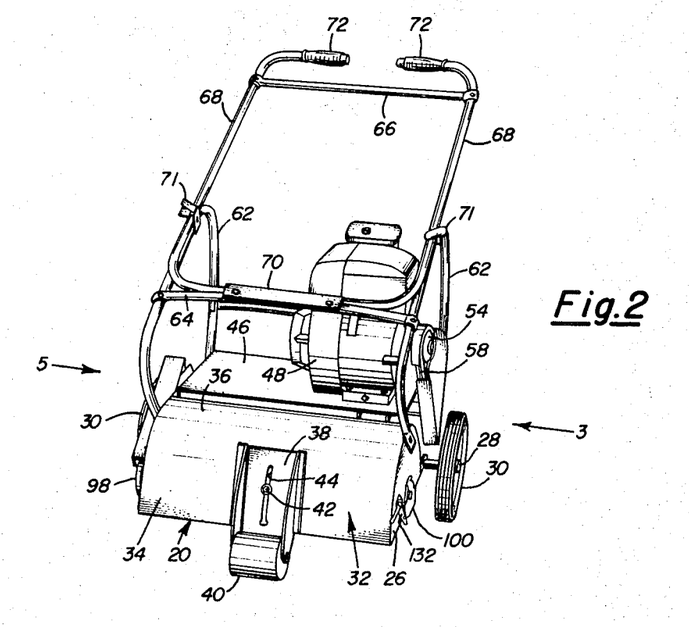
FIG. 2 is a perspective view of the machine looking toward the front and left sides thereof.
Figure 3:
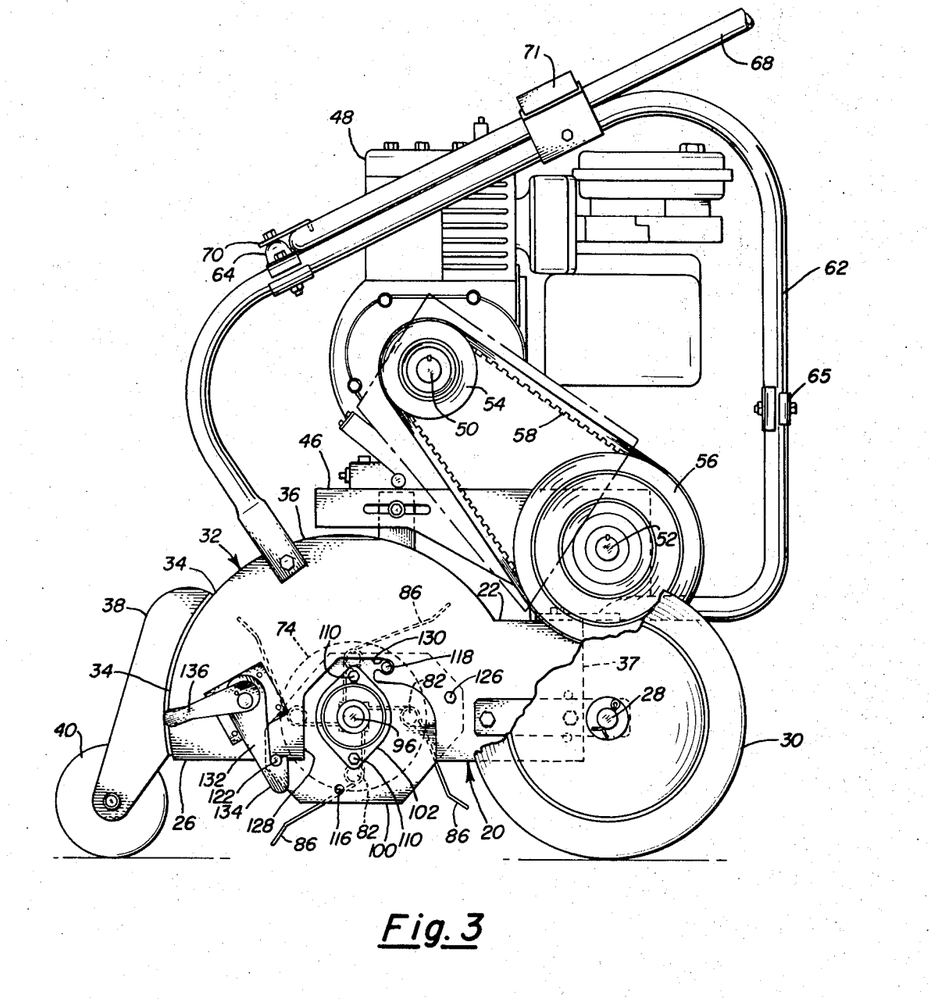
FIG. 3 is a view looking in the direction of arrow 3 in FIG. 2, but on a larger scale with a tine reel in position.
Figure 4:
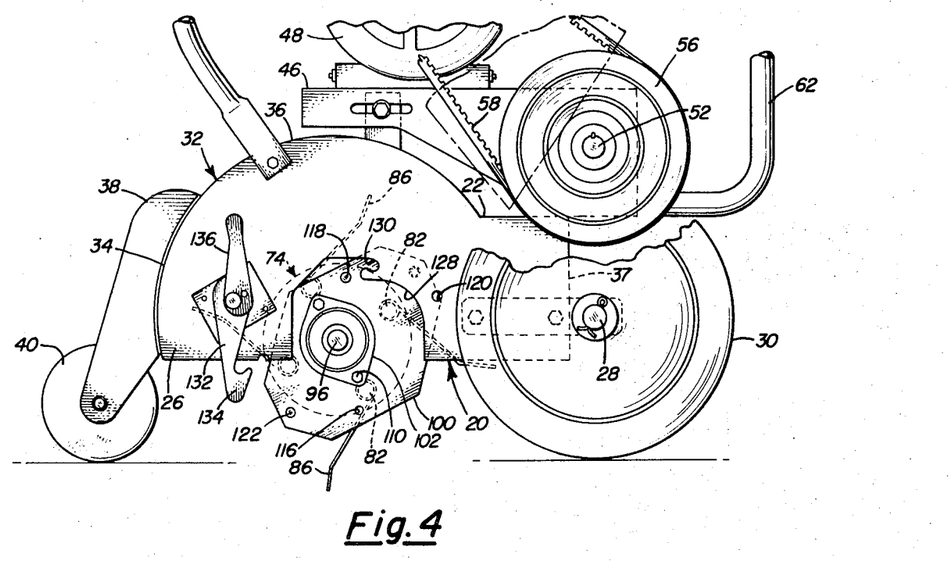
FIG. 4 is a view similar to FIG. 3, but showing the cam lock lever in stud releasing position.
Figure 5:
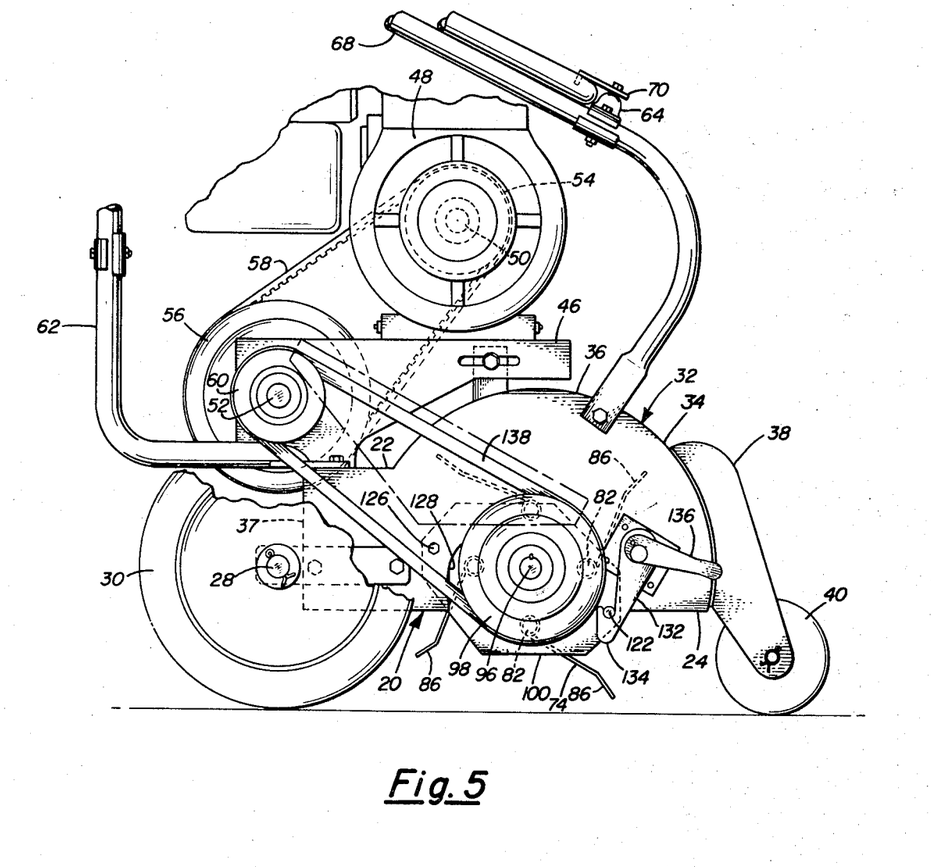
FIG. 5 is a view of the right side of the machine, part being broken away to show the jack shaft and reel shaft connected with one another by sheaves and belts.
Figure 6:
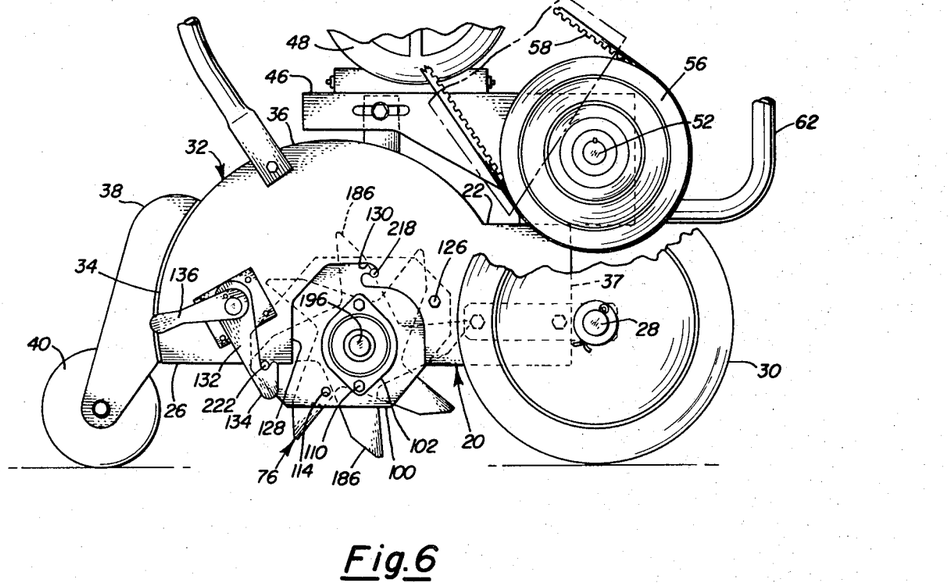
FIG. 6 is a view similar to FIG. 4, but showing a knife-type reel applied to the machine in which the bearing plates are in obvert positions to that shown in FIG. 4, whereby the axis of the reel shaft is lower and extends rearwardly relative to the position of axis of the reel shown in FIG. 3.

By comparing FIG. 3 with FIG. 6, it will be seen that the axis of shaft 196 is lower and extends rearwardly of the axis of shaft 96. The axis of shaft 196 lies 2.50 inches below the axis of stud 218, while in FIG. 3 the axis of shaft 96 lies only 1.75 inches below the axis of stud 118.

It will be observed that the sheave 198 of knife reel 76 is smaller in circumference than the sheave 98 of tine reel 74. When the assembly including the knife reel 76 is substituted for assembly including the tine reel 74, a different size sheave is substituted for sheave 60 on the jack shaft 52. Too, by providing for changes in distance between the axes of the reel shafts from the axis of the pack shaft, which changes are computed relative to the difference in diameter of the sheave on the reels, the same belts can be used for either reel.

It is understood that the knife reel 76 is attached and detached from the machine as was explained with respect to the tine reel.

The knife reel 76 is employed to aerate while dethatching the soil. It also functions for preparing soil for overseeding; it depopulates the plant growth on every kind of turf by removing some living grass as well as thatch and dead grass.

Figures 11, 13, 14:
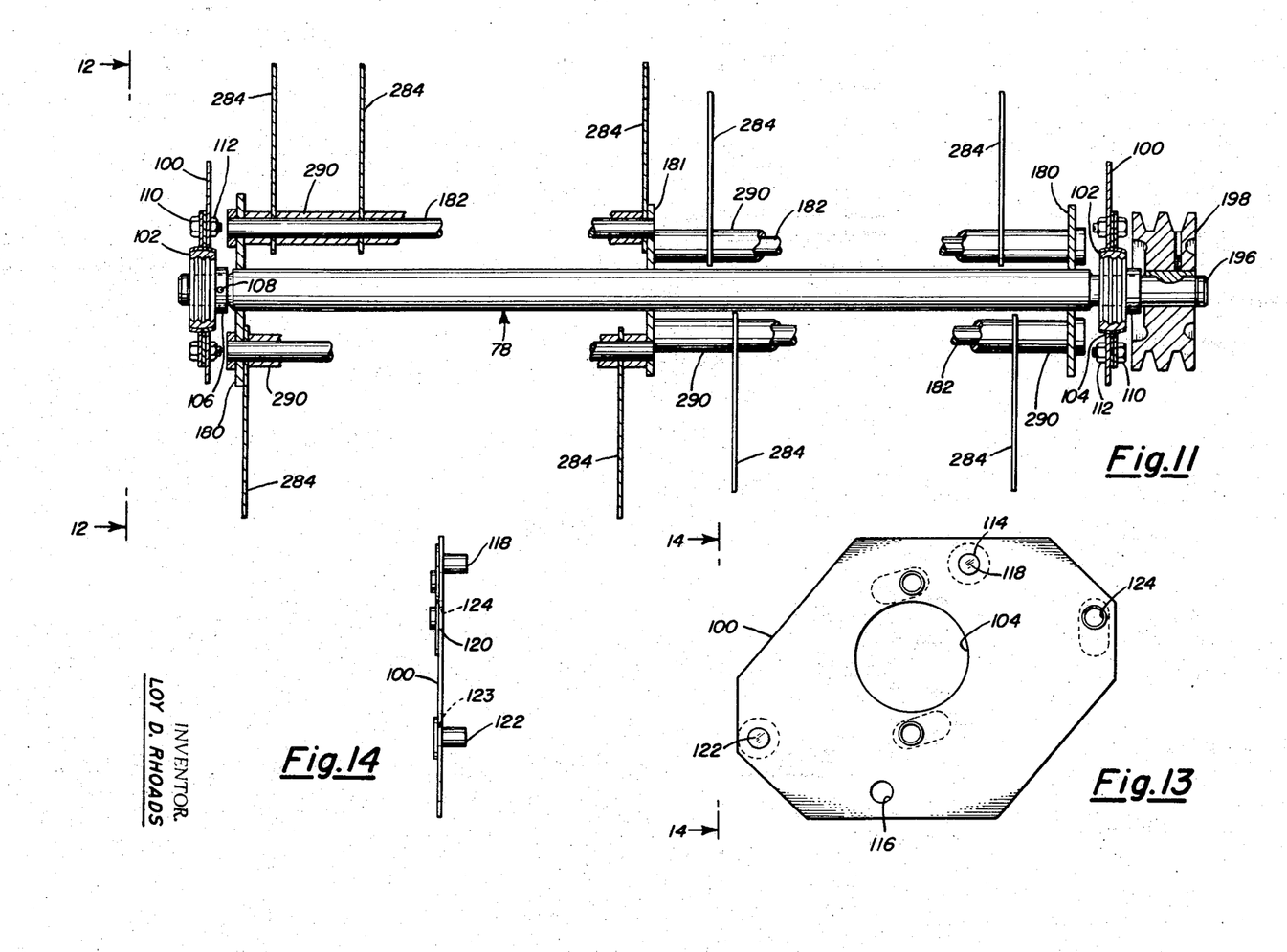
FIG. 11 is a rear view of a flail-type reel.
FIG. 13 is a side view of a bearing plate when applied to a tine reel.
FIG. 14 is an end view of the bearing plate shown in FIG. 13, looking in the direction of arrow 14 of FIG. 13.
Figure 12:
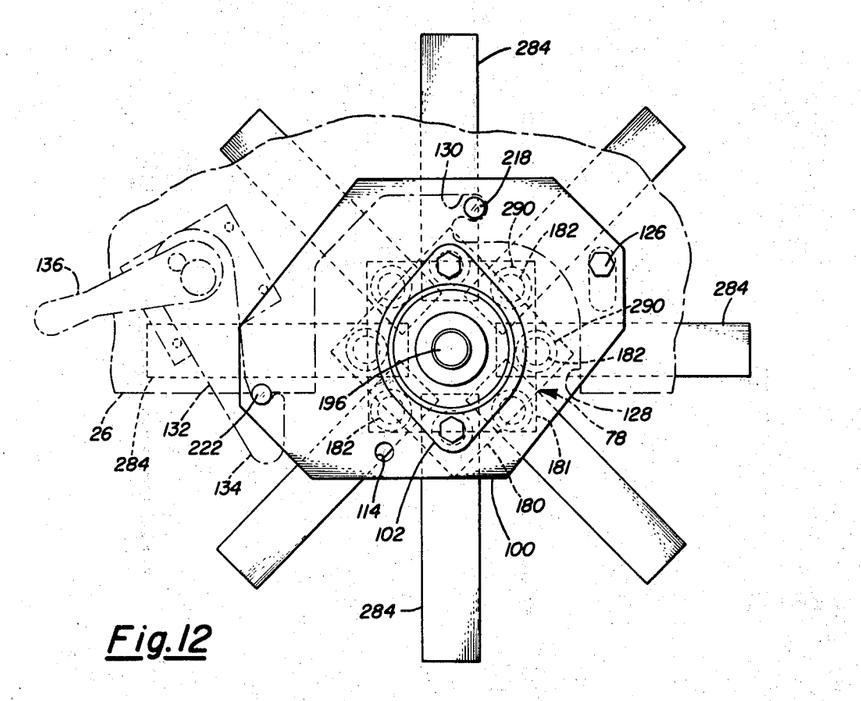
FIG. 12 is an end view of the reel shown in FIG. 11, the view being in the direction of arrow 11, showing the left bearing plate in the position it assumes when locked in the housing.
Figure 15:
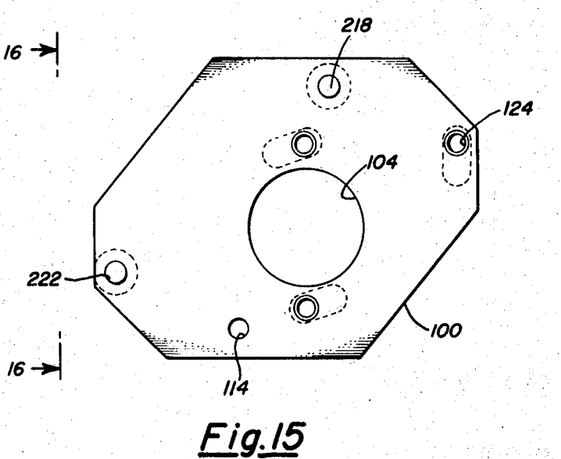
FIG. 15 is a side view of the bearing plate when applied to a knife reel or flail reel.
Figure 16:
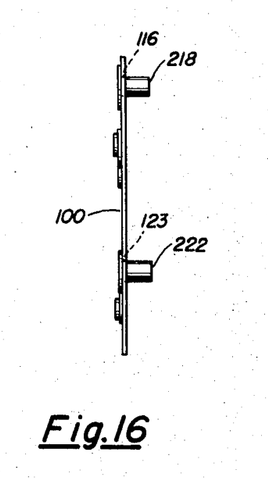
FIG. 16 is an end view of the bearing plate shown in FIG. 15, looking in the direction of arrow 16 of FIG. 15.

Another form of assembly, namely that including the flail reel 78, employs the bearing plates obvert to those on the tine reel. It, therefore, operates at the same r.p.m. as that of the knife reel 76 when the jack shaft reel speed is the same for either reel. The shaft 196 of reel 78 carries the ball bearing assemblies 102 in the same manner as described in connection with the tine reel. Also, the circumference of the sheave 198 is the same as that of the assembly including the knife reel 76, and when it is substituted for tine reel 74, a different size sheave is substituted for sheave 60 on jack shaft 52. Reel 78 includes two end plates 180 and an intermediate plate 181. Plates 180 are suitably secured to the shaft 196. A set of four orbit rods 182 are secured to one of the plates 180 and to plate 181. A set of four like rods are secured to the other plate 180 and to plate 181. The sets of rods are connected with plate 181 at forty-five degrees with respect to one another. Flail blades 284 are suitably fixed to the rods 182 so as to rotate with the shaft 196 and are spaced from one another by spacers 290. The blades are employed to dethatch, depopulate and renovate poor lawns that are to be re-seeded, and also can be employed for breaking up clods.

The reels of the reel assemblies in themselves provide the sole means for retaining the bearing plates 100 of the assemblies in proper position for attachment to the frame side plates 24 and 26.

Thus, it is apparent that the machine can readily accept various forms of reels, each of which is highly useful in treating turf. The reels are readily applied or removed to the machine, and although one operates at different r.p.m. than others, by reason of the fact that like bearing plates can be used for all reel assemblies the same belts can be employed between the driving shaft and the reel shafts.

In each embodiment, the reels move in a counterclockwise direction, as viewed in FIG. 3. The tines, knives or flail, upon engaging the turf, cause the machine to move forward, i.e., to the left as viewed in FIG. 3.

While the form of embodiment herein shown and described, constitutes preferred form, it is to be understood that other forms may be adopted.

I claim:
1. A turf treating machine comprising in combination:
   (A) two spaced supports, at least one of the supports being provided with a slot;
   (B) an assembly including:
      (1) two spaced bearing plates, one of the plates being provided with a stud which is extendible into the slot in the support, said one plate being provided with an abutment,
      (2) bearings carried by the bearing plates,
      (3) a shaft journaled in the bearings,
      (4) turf engaging elements attached to the shaft;
   (C) means for attaching the bearing plates to the supports;
   (D) a lever having:
      (1) an abutment movable into and out of locking relationship with the abutment on the said one bearing plate;
   (E) and means for pivotally supporting the lever on the machine.

2. A machine as defined in claim 1, characterized in that the other support is provided with a slot; that the other bearing plate is provided with a stud, which latter stud is extendible into the latter slot; that the other bearing plate is provided with an abutment; and further characterized in that the machine also comprises:
   (D) a second lever having:
      (1) an abutment movable into and out of locking relationship with the abutment on said other bearing plate,
   (E) and means for pivotally supporting the second mentioned lever on the machine.

3. A turf treating machine comprising in combination:
   (A) two spaced supports, one of the supports being provided with a slot;
   (B) an assembly including:
      (1) two spaced bearing plates, one of the plates being provided with a stud which is extendible into the slot of said one support,
      (2) bearings carried by the bearing plates,
      (3) a shaft journaled in the bearings,
      (4) a reel attached to the shaft, said reel including turf engaging elements and comprising the sole means for retaining the bearing plates in desired spaced relationship,
      (5) a driving element attached to the shaft;
   (C) means on said one support for retaining the stud in the support.

4. A turf treating machine comprising in combination:
   (A) an open bottom compartment having two side plates, said side plates forming two spaced supports, each of said supports being recessed from an edge thereof;
   (B) an assembly including:
      (1) two spaced bearing plates,
      (2) bearings carried by the bearing plates,
      (3) a shaft journaled in the bearings,
      (4) a reel attached to the shaft, said reel including turf-engaging elements, at least part of the assembly being extendible into operative position through the recesses;
   (C) means on the support and bearing plates for attaching the bearing plates in reel operable position to the supports when said part of the assembly extends into the recesses.

5. A turf treating machine as defined in claim 4, characterized in that the recesses extend from the lower edges of the supports.

6. A turf treating machine as defined in claim 4, characterized in that the said reel provides the sole means for retaining the bearing plates in proper spaced relationship for attaching the plates to the two supports.

7. A turf treating machine as defined in claim 6, characterized in that the recesses extend from the lower edges of the supports.

References Cited
UNITED STATES PATENTS

| | | | |
|---|---|---|---|
| 2,283,161 | 5/1942 | Booton | 56—249.5 |
| 2,770,938 | 11/1956 | Kiernan | 56—2 |
| 3,183,653 | 5/1965 | Cromwell | 56—27 |
| 3,199,278 | 8/1965 | Dye | 56—27 |
| 3,221,483 | 12/1965 | Ronning | 56—27 |
| 3,308,612 | 3/1967 | Oblinger | 56—27 |

RUSSELL R. KINSEY, Primary Examiner

U.S. Cl. X.R.

56—2